United States Patent
Noto et al.

(10) Patent No.: US 9,845,789 B2
(45) Date of Patent: Dec. 19, 2017

(54) SYSTEM AND METHOD FOR MONITORING AND CONTROLLING WIND TURBINES WITHIN A WIND FARM

(71) Applicant: General Electric Company, Schenectady, NY (US)

(72) Inventors: William Borea Noto, Niskayuna, NY (US); Paul Oliver Caffrey, Roanoke, VA (US); Joerg Hagmann, Bad Bentheim (DE)

(73) Assignee: GENERAL ELECTRIC COMPANY, Schenectady, NY (US)

(*) Notice: Subject to any disclaimer, the term of this patent is extended or adjusted under 35 U.S.C. 154(b) by 306 days.

(21) Appl. No.: 14/521,661

(22) Filed: Oct. 23, 2014

(65) Prior Publication Data

US 2016/0115942 A1   Apr. 28, 2016

(51) Int. Cl.
F03D 7/04 (2006.01)
F03D 9/00 (2016.01)
F03D 17/00 (2016.01)
F03D 9/25 (2016.01)

(52) U.S. Cl.
CPC ............. *F03D 7/048* (2013.01); *F03D 7/047* (2013.01); *F03D 9/257* (2017.02); *F03D 17/00* (2016.05); *F05B 2260/845* (2013.01); *Y02E 10/723* (2013.01)

(58) Field of Classification Search
CPC .......... F03D 7/048; F03D 17/00; F03D 9/005; F03D 7/047; F05B 2260/845
See application file for complete search history.

(56) References Cited

U.S. PATENT DOCUMENTS

| | | | |
|---|---|---|---|
| 6,169,928 B1 | 1/2001 | Olson et al. | |
| 6,925,385 B2* | 8/2005 | Ghosh | F03D 7/0284 702/1 |
| 7,013,203 B2* | 3/2006 | Moore | F03D 7/047 290/44 |
| 7,025,567 B2* | 4/2006 | Wobben | F03D 7/0224 415/118 |

(Continued)

FOREIGN PATENT DOCUMENTS

| | | |
|---|---|---|
| CA | 2780535 A1 | 12/2013 |
| CN | 103269381 A | 8/2013 |
| WO | WO 2014/060465 A1 | 4/2014 |

*Primary Examiner* — Charles Kasenge
(74) *Attorney, Agent, or Firm* — Dority & Manning, P.A.

(57) ABSTRACT

In one aspect, a system for monitoring and controlling the operation of wind turbines located within a wind farm may generally include first and second wind turbines. The first wind turbine may include a first turbine controller configured to monitor an operating parameter(s) associated with the first wind turbine and provide a first control interface for controlling the operation of the first wind turbine. The second wind turbine may include a second turbine controller configured to monitor an operating parameter(s) associated with the second wind turbine and provide a second control interface for controlling the operation of the second wind turbine. The system may also include a secondary computing device coupled to the second turbine controller. The second turbine controller may be configured to provide the secondary computing device access to the first control interface in order to allow the operation of the first wind turbine to be controlled.

17 Claims, 5 Drawing Sheets

(56) References Cited

U.S. PATENT DOCUMENTS

| | | | |
|---|---|---|---|
| 7,960,850 B2* | 6/2011 | Rasmussen | F03D 7/028 290/44 |
| 8,219,698 B2 | 7/2012 | Johnson et al. | |
| 8,392,592 B2 | 3/2013 | Johnson et al. | |
| 8,660,706 B2* | 2/2014 | Szemkus | F03D 7/047 290/44 |
| 8,694,169 B2* | 4/2014 | Lovmand | F03D 7/047 290/44 |
| 8,718,832 B2* | 5/2014 | Hashimoto | F03D 7/0284 290/44 |
| 9,325,698 B2* | 4/2016 | Lovmand | H04L 63/0823 |
| 2004/0230377 A1* | 11/2004 | Ghosh | F03D 7/0284 702/3 |
| 2005/0090937 A1* | 4/2005 | Moore | F03D 7/047 700/286 |
| 2005/0271128 A1 | 12/2005 | Williams et al. | |
| 2008/0168092 A1 | 7/2008 | Boggs et al. | |
| 2009/0204266 A1* | 8/2009 | Lovmand | F03D 7/047 700/287 |
| 2010/0057265 A1* | 3/2010 | Szemkus | F03D 7/047 700/287 |
| 2011/0140431 A1* | 6/2011 | Landa | F03D 7/0224 290/44 |
| 2011/0166717 A1* | 7/2011 | Yasugi | F03D 7/0284 700/287 |
| 2011/0313726 A1* | 12/2011 | Parthasarathy | G05B 23/024 702/179 |
| 2012/0020786 A1* | 1/2012 | Ayres | F03D 7/047 416/1 |
| 2012/0066544 A1 | 3/2012 | Ichinose | |
| 2012/0104755 A1* | 5/2012 | Hashimoto | F03D 7/0284 290/44 |
| 2012/0191249 A1* | 7/2012 | Zapata | F03D 7/047 700/275 |
| 2013/0134710 A1* | 5/2013 | Yuan | H02M 1/00 290/44 |
| 2013/0290705 A1* | 10/2013 | Lovmand | H04L 63/0823 713/156 |

\* cited by examiner

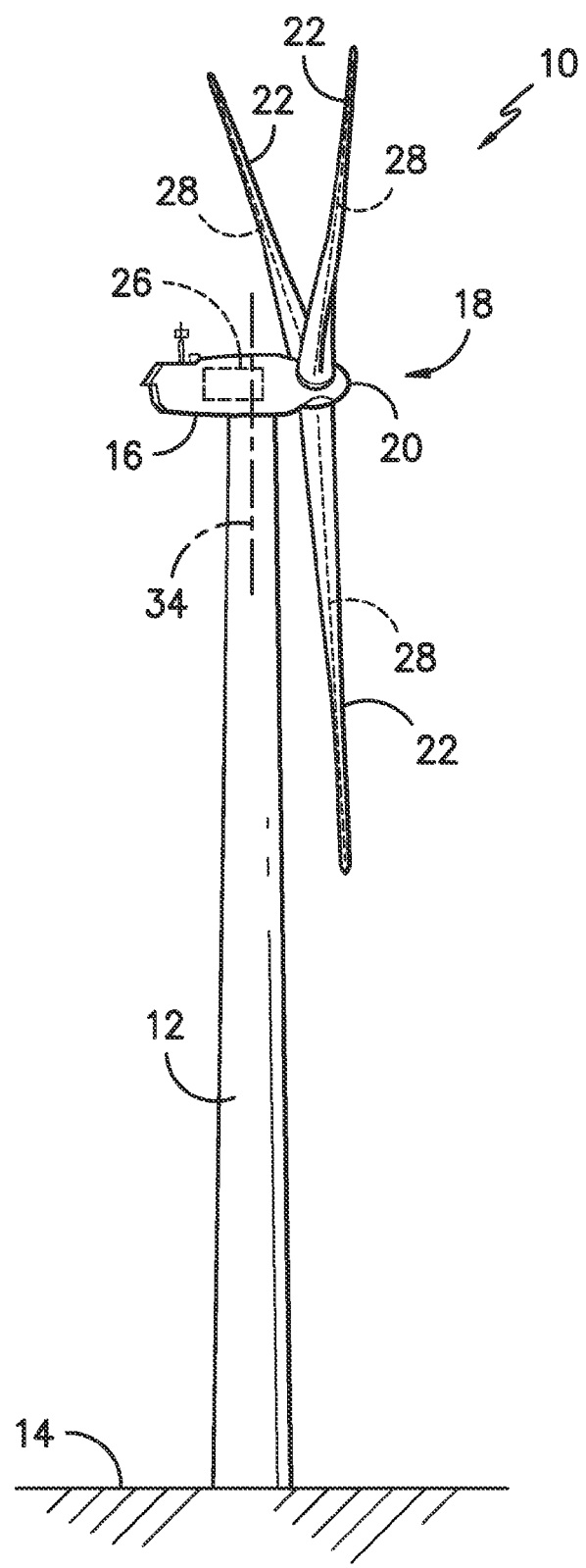
FIG. -1-

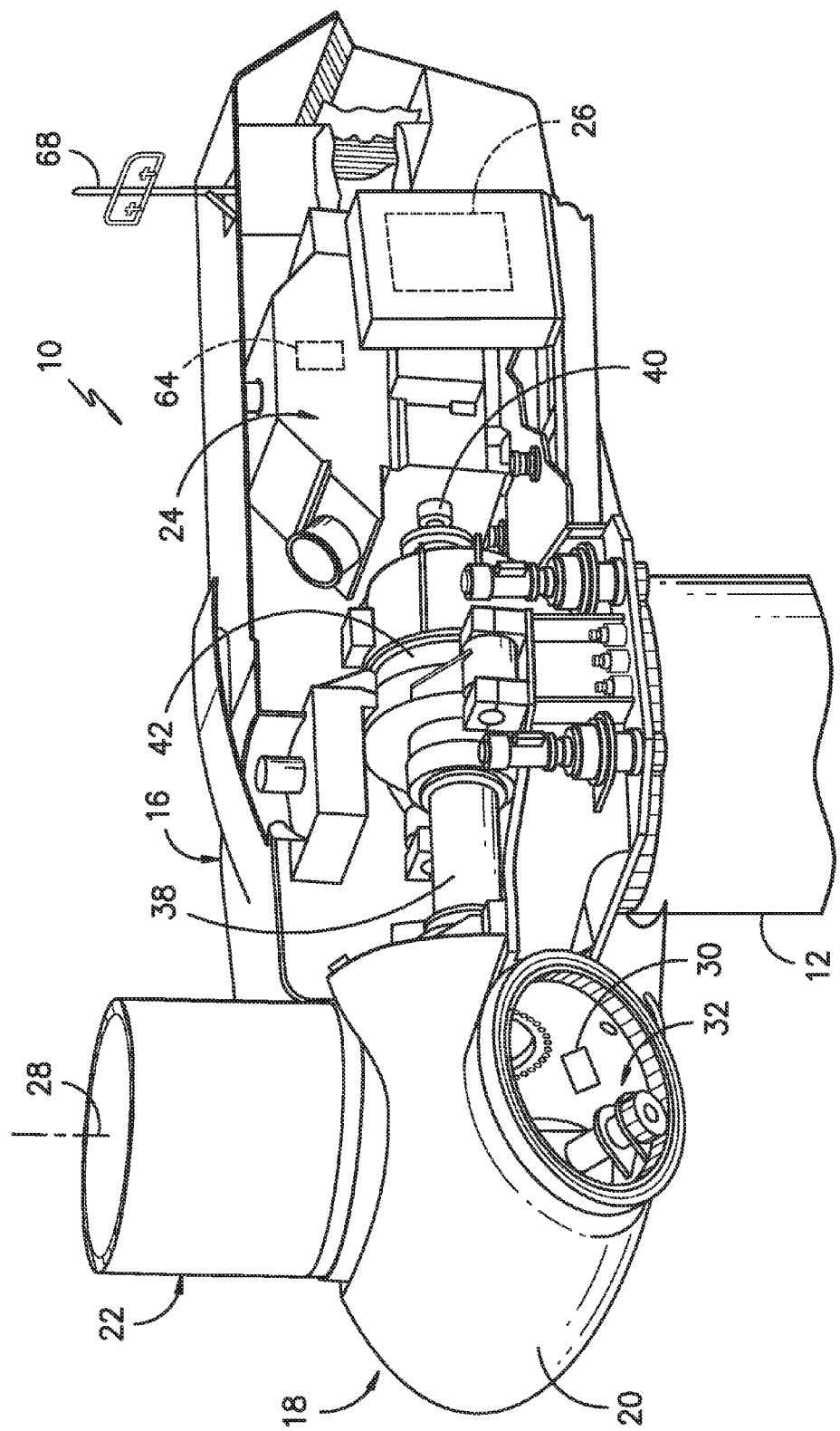
FIG. -2-

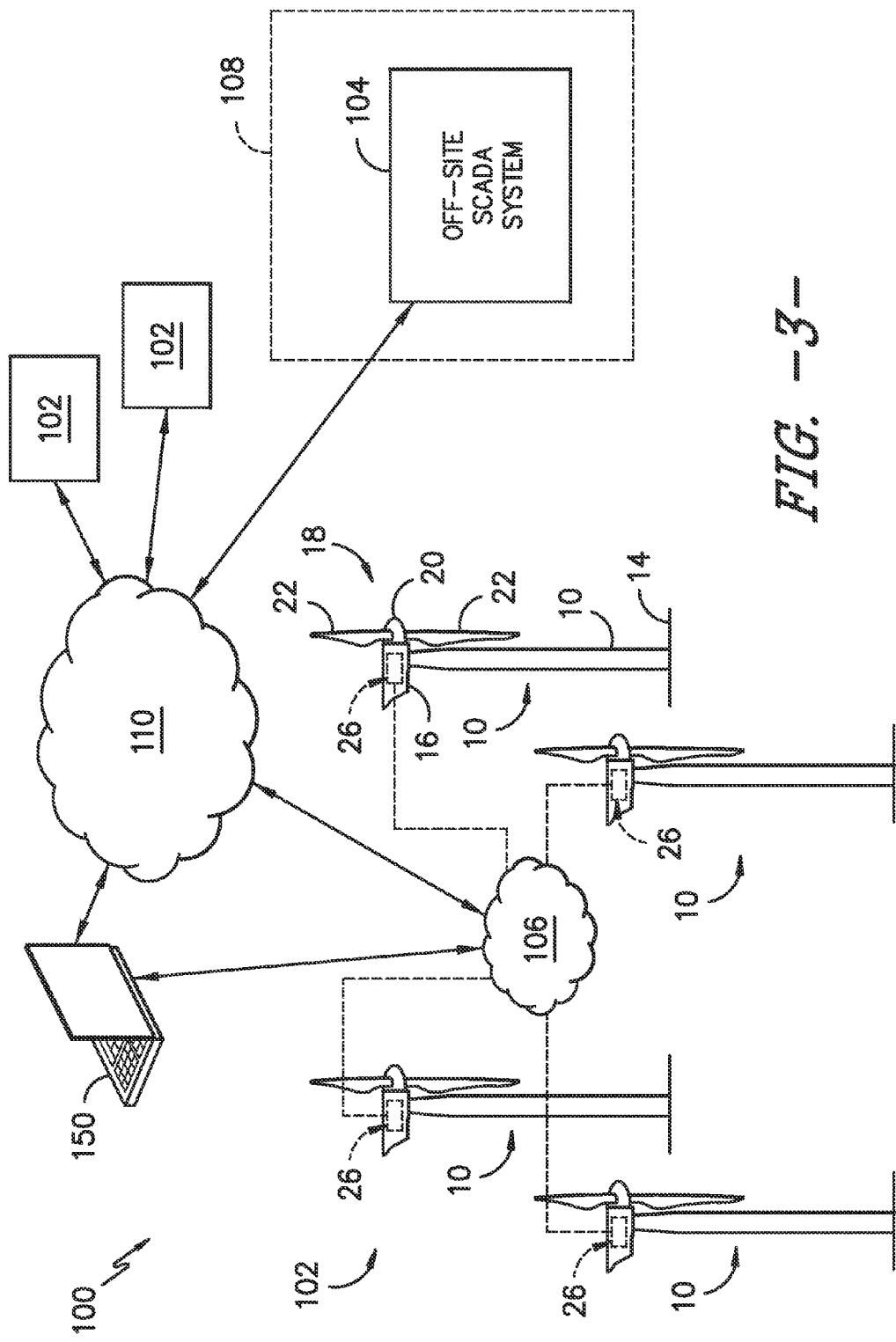
FIG. -3-

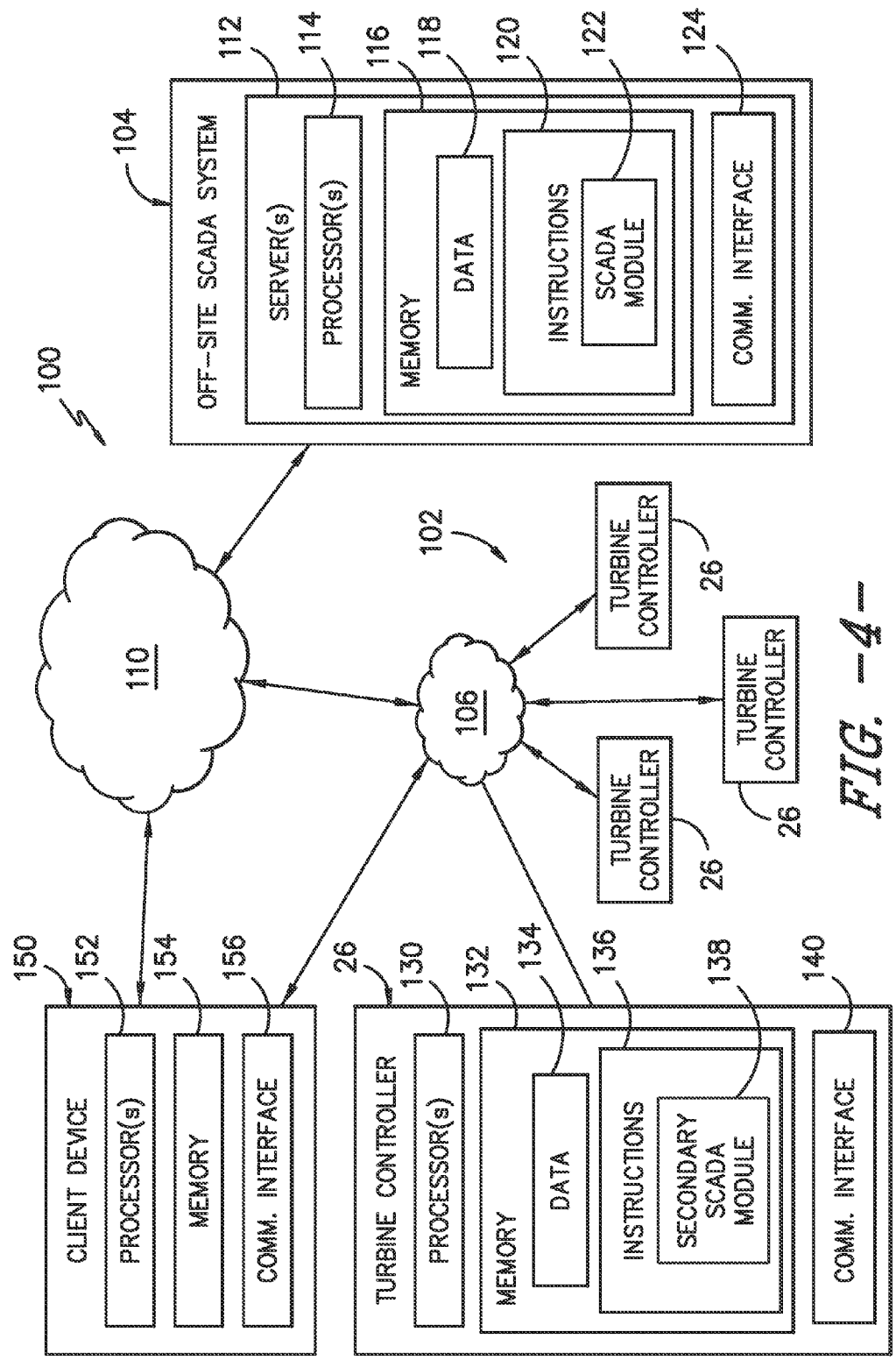

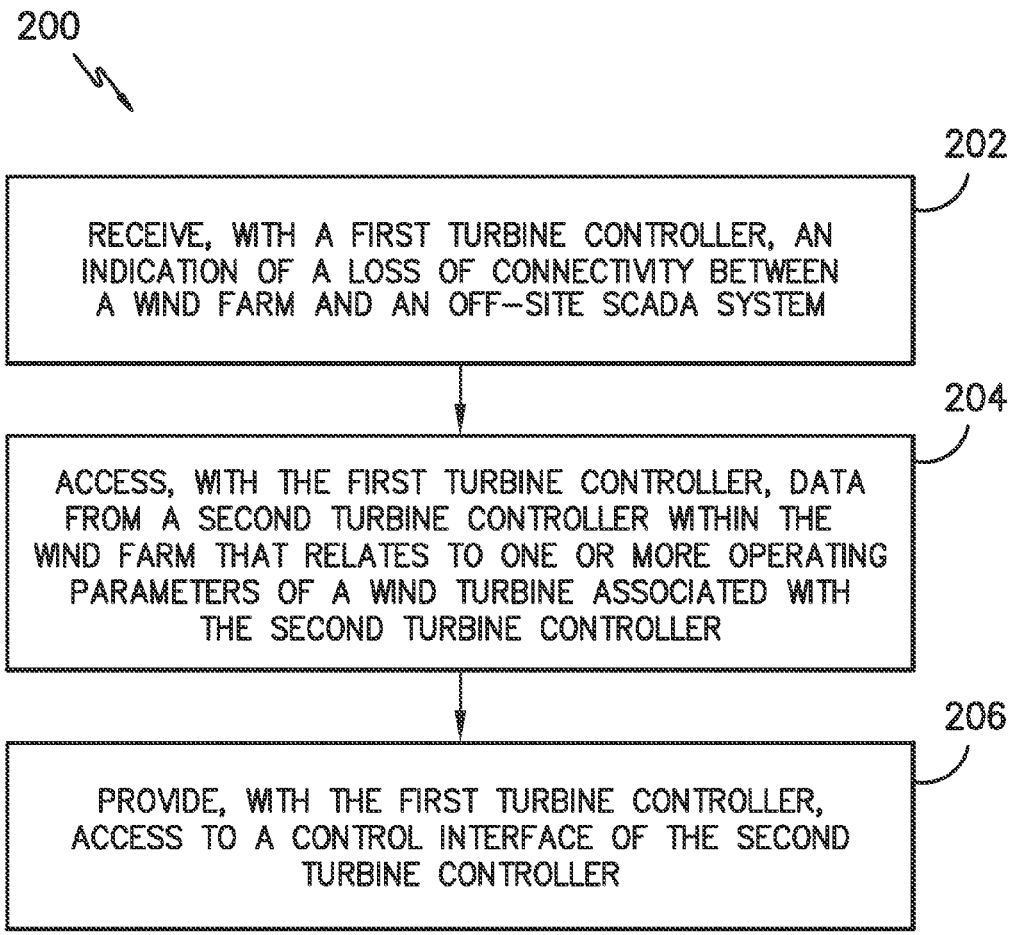
FIG. -5-

SYSTEM AND METHOD FOR MONITORING AND CONTROLLING WIND TURBINES WITHIN A WIND FARM

FIELD OF THE INVENTION

The present subject matter relates generally to wind turbines located within a wind farm and, more particularly, to a system and method that allows for the operation of wind turbines to be monitored and/or controlled both remotely via an off-site supervisory control and data acquisition (SCADA) system and locally via access provided from individual turbine controllers.

BACKGROUND OF THE INVENTION

A wind farm typically consists of a group of interconnected wind turbines disposed at a given farm site. The wind farm may include a group of two wind turbines or a group of hundreds of wind turbines, with the turbines being spread out over a small area (e.g., several hundred square meters) or over an extended area (e.g., hundreds of square kilometers). As is generally understood, the farm site typically corresponds to a location or area that provides the desired amount of wind exposure, which may be an offshore location or an onshore location.

The wind turbines within a wind farm are typically monitored and controlled using a supervisory control and data acquisition (SCADA) system that is housed within a control station located at the wind farm site. Specifically, for each wind farm installation, an individual control station is typically built or installed at the site that includes a large amount of computing equipment, networking and communications equipment and other equipment that enables the SCADA system to locally monitor and control the operation of the wind turbines. For example, the turbine controller housed within each wind turbine may be communicatively coupled to various computing devices located within the on-site control station. The control station computing devices may then implement the SCADA system by collecting operating data from the turbine controllers and transmitting control signals to the turbine controllers for controlling the operation of their corresponding wind turbines.

Unfortunately, the cost of installing the on-site control station is typically quite expensive. In addition, such cost is typically the same regardless of whether ten wind turbines or two hundred wind turbines are contained within the wind farm. Accordingly, on-site control stations implementing SCADA systems contribute significantly to the overall expenses related to installing and maintaining a wind farm.

Thus, an improved system and method that allows for multiple wind farms to be effectively and efficiently monitored and controlled from a single, off-site SCADA system would be welcomed in the technology. In doing so, a need also exists for the system and method to be able to accommodate network connectivity issues between the off-site SCADA system and a given wind farm to ensure that the wind farm may continue to be maintained despite a loss of connection with the remote SCADA system.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for monitoring and controlling the operation of wind turbines located within a wind farm. The system may generally include a first wind turbine and a second wind turbine located within the wind farm. The first wind turbine may include a first turbine controller configured to monitor one or more operating parameters associated with the first wind turbine and provide a first control interface for controlling the operation of the first wind turbine. The second wind turbine may include a second turbine controller configured to monitor one or more operating parameters associated with the second wind turbine and provide a second control interface for controlling the operation of the second wind turbine. The second turbine controller may also include a processor and associated memory. The memory may store instructions that, when implemented by the processor, configure the second turbine controller to access data from the first turbine controller. In addition, the system may include an off-site supervisory control and data acquisition (SCADA) system located remote to the wind farm. The off-site SCADA system may include a server communicatively coupled to the first and second turbine controllers. The server may be configured to communicate control signals to the first and second turbine controllers in order to control the operation of the first and second wind turbines. Moreover, the off-site SCADA system may be further configured to receive data associated with the operating parameters monitored by the first and second turbine controllers. Further, when connectivity is lost between the wind farm and the off-site SCADA system, the second turbine controller may be configured to access data from the first turbine controller associated with the one or more operating parameter of the first wind turbine in order to monitor the operation of the first wind turbine.

In another aspect, the present subject matter is directed to a method for monitoring and controlling the operation of wind turbines contained within a wind farm, wherein the wind farm includes a first wind turbine having a first turbine controller and a second wind turbine having a second turbine controller. The method may generally include receiving, with the first turbine controller, an indication of a loss of connectivity with an off-site supervisory control and data acquisition (SCADA) system configured to transmit control signals to the first and second turbine controllers for controlling the operation of the first and second wind turbines. In addition, the method may include accessing data from the second turbine controller associated with one or more operating parameters of the second wind turbine and providing access to a control interface of the second turbine controller.

In a further aspect, the present subject matter is directed to a system for monitoring and controlling the operation of wind turbines located within a wind farm. The system may generally include a first wind turbine and a second wind turbine. The first wind turbine may include a first turbine controller configured to monitor one or more operating parameters associated with the first wind turbine and provide a first control interface for controlling the operation of the first wind turbine. The second wind turbine may include a second turbine controller configured to monitor one or more operating parameters associated with the second wind turbine and provide a second control interface for controlling the operation of the second wind turbine. The second turbine controller may include a processor and associated memory. The memory may store instructions that, when implemented by the processor, configure the second turbine controller to provide access to the first control interface of the first turbine controller. In addition, the system may include a secondary computing device communicatively coupled to the second turbine controller via a network. The second turbine controller may be configured to provide the secondary computing device access to the first control interface in order to allow the operation of the first wind turbine to be controlled by the secondary computing device.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine;

FIG. 2 illustrates a perspective, internal view of one embodiment of a nacelle suitable for use with the wind turbine shown in FIG. 1;

FIG. 3 illustrates a simplified view of one embodiment of a system for monitoring and controlling the operation of wind turbines located within a wind farm in accordance with aspects of the present subject matter;

FIG. 4 illustrates a schematic view of various components of the system shown in FIG. 3; and FIG. 5 illustrates a flow diagram of one embodiment of a method for monitoring and controlling the operation of wind turbines located within a wind farm in accordance with aspects of the present subject matter.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for monitoring and controlling the operation of wind turbines located within a wind farm. Specifically, in several embodiments, an off-site supervisory control and data acquisition (SCADA) system may be established at a given data or control center. The off-site SCADA system may then be communicatively coupled to one or more remote wind farms to allow the SCADA system to remotely monitor and control the operation of the various wind turbines contained within the wind farm(s).

By providing an off-site SCADA system that serves a plurality of different wind farms, the costs of installing and maintaining the centralized control station may be shared amongst all of the wind farms, thereby reducing the overall costs to operate each individual wind farm. In addition, the shared off-site SCADA system may provide a more efficient means of installing software upgrades, since the upgrade need only be installed at the centralized control station as opposed to each individual on-site control station.

Additionally, in accordance with aspects of the present subject matter, each turbine controller within a given wind farm may be provided with suitable computer-readable instructions or software that allows the turbine controller to implement locally one or more of the functions of the off-site SCADA system. As such, when connectivity is lost between the SCADA system and the wind farm, any one of the turbine controllers may be utilized to collect data associated with the operation of the various wind turbines within the wind farm and/or to provide access for controlling the operation of the various wind turbines. For example, the software installed onto the turbine controllers may allow each turbine controller to provide an operator access (e.g., via an associated computing device) to the Human-Machine Interface (HMI) (also referred to herein as the control interface) of every other turbine controller within the wind farm (e.g. via a suitable link), thereby providing a means for the operator to locally control the operation of each wind turbine. In addition, the software installed onto the turbine controllers may allow each turbine controller to report or monitor one or more operating parameters associated with the wind turbines located within the wind farm. For example, in one embodiment, each turbine controller may be configured access data from every other turbine controller that is associated with one or more key performance indicators of every wind turbine within the wind farm, such as the fault status of each wind turbine, the rotational speed of each wind turbine, the wind speed at or adjacent to each wind turbine and/or the power output of each wind turbine.

Referring now to the drawings, FIG. 1 illustrates a perspective view of one embodiment of a wind turbine 10 in accordance with aspects of the present subject matter. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a turbine control system or turbine controller 26 centralized within the nacelle 16 (or disposed at any other suitable location within and/or relative to the wind turbine 10). In general, the turbine controller 26 may comprise a computer or other suitable processing unit. Thus, in several embodiments, the turbine controller 26 may include suitable computer-readable instructions that, when implemented, configure the controller 26 to perform various different functions, such as receiving, transmitting and/or executing wind turbine control signals. As such, the turbine controller 26 may generally be configured to control the various operating modes (e.g., start-up or shut-down sequences) and/or components of the wind turbine 10. For example, the controller 26 may be configured to adjust the blade pitch or pitch angle of each rotor blade 22 (i.e., an angle that determines a perspective of the blade 22 with respect to the direction of the wind) about its pitch axis 28 in order to control the rotational speed of the rotor blade 22 and/or the power output generated by the wind turbine 10. For instance, the turbine controller 26 may control the pitch angle of the rotor blades 22, either individually or simultaneously, by transmitting suitable control signals to one or more pitch drives or pitch adjustment mechanisms 32 (FIG. 2) of the wind turbine 10.

Referring now to FIG. 2, a simplified, internal view of one embodiment of the nacelle 16 of the wind turbine 10 shown in FIG. 1 is illustrated. As shown, a generator 24 may be disposed within the nacelle 16. In general, the generator 24 may be coupled to the rotor 18 for producing electrical power from the rotational energy generated by the rotor 18. For example, as shown in the illustrated embodiment, the rotor 18 may include a rotor shaft 38 coupled to the hub 20 for rotation therewith. The rotor shaft 38 may, in turn, be rotatably coupled to a generator shaft 40 of the generator 24 through a gearbox 42. As is generally understood, the rotor shaft 38 may provide a low speed, high torque input to the gearbox 42 in response to rotation of the rotor blades 22 and the hub 20. The gearbox 42 may then be configured to convert the low speed, high torque input to a high speed, low torque output to drive the generator shaft 40 and, thus, the generator 24.

Additionally, as indicated above, the turbine controller 26 may also be located within the nacelle 16 (e.g., within a control box or panel). However, in other embodiments, the turbine controller 26 may be located within any other component of the wind turbine 10 or at a location outside the wind turbine. As is generally understood, the turbine controller 26 may be communicatively coupled to any number of the components of the wind turbine 10 in order to control the operation of such components. For example, as indicated above, the turbine controller 26 may be communicatively coupled to each pitch adjustment mechanism 32 of the wind turbine 10 (one for each rotor blade 22) via a pitch controller 30 to facilitate rotation of each rotor blade 22 about its pitch axis 28.

In addition, the turbine controller 26 may also be communicatively coupled to one or more sensors for monitoring various operating parameters of the wind turbine 10. For example, in several embodiments, the wind turbine 10 may include one or more generator sensors 64 configured to monitor one or more generator-related operating parameters of the wind turbine 10, such as the power output of the generator 24, the rotational speed of the generator 24, the generator torque and/or the like. Similarly, the turbine controller 26 may be communicatively coupled to one or more wind sensors 68 for monitoring one or more wind conditions of the wind turbine 10, such as the wind speed, the wind direction, the turbulence or turbulence intensity of the wind and/or the like.

Of course, the wind turbine 10 may further include various other suitable sensors for monitoring any other suitable operating parameters of the wind turbine 10. For instance, the wind turbine 10 may include one or more load sensors (not shown) for monitoring the loads acting on one or more of the wind turbine components (e.g., the loads acting on the blades 22, the hub 22 and/or the tower 12), one or more shaft sensors (not shown) configured to monitor one or more shaft-related operating parameters of the wind turbine 10 (e.g., the deflection or the rotational speed of the rotor shaft 38) and/or the like. It should be appreciated that the various sensors described herein may correspond to pre-existing sensors of a wind turbine 10 and/or sensors that have been specifically installed within the wind turbine 10 to allow one or more operating parameters to be monitored.

It should also be appreciated that, as used herein, the term "monitor" and variations thereof indicates that the various sensors of the wind turbine 10 may be configured to provide a direct or indirect measurement of the operating parameters being monitored. Thus, the sensors may, for example, be used to generate signals relating to the operating parameter being monitored, which can then be utilized by the turbine controller 26 (or any other suitable controller or computing device) to determine the actual operating parameter.

Referring now to FIG. 3, one embodiment of a system 100 for monitoring and controlling the operation of wind turbines 10 located within a wind farm 102 is illustrated in accordance with aspects of the present subject matter. In general, the system 100 may include a wind farm 102 containing a plurality of wind turbines 10 and an off-site supervisory control and data acquisition (SCADA) system 104 commutatively coupled to the wind turbines 10 located within the wind farm 102. In the illustrated embodiment, the wind farm 102 is simply shown as including four wind turbines 10. However, it should be readily appreciated by those of ordinary skill in the art that the wind farm 102 may include any other number of wind turbines 10, such as greater than four wind turbines 10 or even less than four wind turbines 10. For instance, it is common for wind farms 102 to include fifty or more wind turbines 10 or even one hundred or more wind turbines 10.

It should also be appreciated that each wind turbine 10 located within the wind farm 102 may generally be configured the same as or similar to the wind turbine 10 described above with reference to FIGS. 1 and 2. For example, each wind turbine 10 may include, a tower 12 extending from a support surface 14, a nacelle 16 mounted on the tower 12, and a rotor 18 coupled to the nacelle 16, with the rotor 18 comprising a rotatable hub 20 and one or more rotor blades 22. Additionally, each wind turbine 10 may include a turbine controller 26 configured to monitor the turbine's operating parameters as well as provide a Human-Machine Interface (HMI) or control interface for controlling the operation of the wind turbine 10.

In several embodiments, each turbine controller 26 may be communicatively coupled to every other turbine controller 26 within the wind farm 102 via a local wind farm network 106. In general, the wind farm network 106 may correspond to any suitable wired or wireless network that allows the various turbine controllers 26 to communicate with one another via any suitable communications protocol (e.g. TCP/IP, HTTP, SMTP, FTP) and/or using any suitable encodings/formats (e.g. HTML, XML) and/or protection schemes (e.g. VPN, secure HTTP, SSL). For example, in one embodiment, the wind farm network 106 may correspond to a local-area network (LAN).

As indicated above, the system 100 may also include an off-site SCADA system 104 located remote to the wind farm 102. For example, in several embodiments, the SCADA system 104 may be located in a remote data or control center 108, such as a data center dedicated to housing computing and networking/communications equipment. However, in other embodiments, the SCADA system 104 may be disposed at any other suitable remote location.

In general, the off-site SCADA system 104 may be configured to remotely and dynamically monitor and/or control the operation of the various wind turbines 10 located within the wind farm 102. Specifically, as will be described below, the SCADA system 104 may include various components, such as one or more computing devices (e.g., one or more servers) and/or related networking/communications equipment, that allow the system 104 to provide the functionality described herein. For example, the server(s) may be configured to collect data from the various turbine controllers 26 that is associated with one or more of the monitored operating parameters of the wind turbines 10. In addition, the server(s) may be configured to provide a Human-Machine Interface (HMI) that allows for the presentation of the collected data to the remote operator of the wind farm 102. By using the HMI, the operator can both monitor and control the operation of each wind turbine 10 within the wind farm 102. For example, based on the monitored operating parameter(s) of a given wind turbine(s) 10, the operator may utilize the HMI to instruct the associated turbine controller(s) 26 to adjust the operation of the wind turbine(s) 10. In such instance, the server(s) may be configured to transmit a suitable control command(s) to the appropriate turbine controller(s) 26 in order to adjust the operation of the wind turbine(s) 10 in accordance with the operator's instructions.

It should be appreciated that the off-site SCADA system 104 may generally serve as the "nerve center" for the wind farm 102. Specifically, the SCADA system 104 may be configured to continuously analyze the performance-related information acquired from each turbine controller 26 and present such information to the operator via the HMI. As a result, the operator may be allowed to dynamically control the operation of the various wind turbines 10 contained within the wind farm 102. In addition, the SCADA system 104 may also be configured to store all of the performance-related information provided by the turbine controllers 26, which may allow the system 104 to analyze the performance of each wind turbine 10 over time. Such time-aggregated data may allow for periodic maintenance and/or corrective actions to be scheduled/implemented as well as provide a means for monitoring the wind farm 102 with regard to its long-term performance requirements.

To provide for such remote data acquisition and operational control, it should be appreciated that the off-site SCADA system 104 may generally be configured to be coupled to each turbine controller 26 within the wind farm 102 (e.g., via the local wind farm network 106) through a suitable network 110. In general, the network 110 may correspond to any suitable wired or wireless network that allows the SCADA system 104 to communicate with the various turbine controllers 26 via any suitable communications protocol (e.g. TCP/IP, HTTP, SMTP, FTP) and/or using any suitable encodings/formats (e.g. HTML, XML) and/or protection schemes (e.g. VPN, secure HTTP, SSL). For example, in one embodiment, the network 110 may correspond to a wide-area network (WAN).

It should also be appreciated that, although the system 100 has been generally described above with reference to a single wind farm 102, the associated off-site SCADA system 104 may generally be configured to be communicatively coupled to any number of wind farms 102. For example, as shown in FIG. 3, the SCADA system 104 may be configured to serve as the "nerve center" for a plurality of different wind farms 102 located at a plurality of different of locations such that the performance of every wind turbine located within the various wind farms 102 may be monitored and controlled from a single location.

Additionally, in several embodiments, an operator of a given wind farm 102 may be configured to communicate with both the off-site SCADA system 104 and the individual turbine controllers 26 via a separate, client computing device 150. Specifically, as shown in FIG. 3, the client device 150 may be configured to connect to the local farm network 106 and/or the network 110, thereby allowing the device 150 to gain access to the SCADA system 104 and/or the turbine controllers 26. For example, as will be described below, when network connectivity is lost between the SCADA system 104 and the wind farm, the operator may utilize his/her client device 150 to connect to one of the turbine controllers 26, which may then allow the operator to monitor the operation of every wind turbine 10 within the wind farm 102 and/or gain access to the control interface provided by each turbine controller 26.

Referring now to FIG. 4, a schematic view of the system 100 shown in FIG. 3 is illustrated in accordance with aspects of the present subject matter. As shown in FIG. 4, the off-site SCADA system 104 may include one or more servers 112 configured to communicate with each turbine controller 26 within the wind farm 102 via the network 110. For instance, in several embodiments, the SCADA system 104 may be implemented within a server farm including a plurality of servers 112, with each server 112 being configured to communicate with the turbine controllers 26 located within one or more wind farms 102. In general, each server 112 may correspond to and/or may be associated with a computing device or any other suitable processing unit. It should be appreciated that, as used herein, the term "server" may correspond to physical computing devices or virtual machines hosted on physical computing devices.

As particularly shown in FIG. 4, each server 112 may generally include and/or may be associated with one or more processor(s) 114 and associated memory 116 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 116 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 116 may generally be configured to store information accessible to the processor(s) 114, including data 118 that can be retrieved, manipulated, created and/or stored by the processor(s) 114 and instructions 120 that can be executed by the processor(s) 114.

In several embodiments, the data 118 may be stored in one or more databases. For example, the memory 116 may include a performance database (not shown) including performance data collected for the various wind turbines 10 contained within a wind farm 102. Specifically, as indicated above, each turbine controller 26 may be configured to monitor various operating parameters associated with the operating performance of its associated wind turbine 10. As such, performed-related data may be transmitted from each turbine controller 26 to the server(s) 112 (e.g., via the network 110) and subsequently stored within the performance database.

Additionally, in several embodiments, the instructions 120 stored within the memory 116 of each server 112 may be executed by the processor(s) 114 to implement a SCADA module 122. In general, the SCADA module 122 may be configured to allow the off-site SCADA system 104 to monitor and control the operation of the various wind turbines 10 located within the wind farm 102. For example, the SCADA module 122 may be configured to receive, sort and/or otherwise process the performance data transmitted from the turbine controllers 26. In addition, the SCADA module 122 may be configured to provide a suitable HMI to allow an operator to view the performance data associated with a given wind turbine(s) 10 and to control the operation of such wind turbine(s) 10. For example, the SCADA module 122 may be configured to access the individual HMI or control interface of each turbine controller 26 and, based on suitable inputs provided by the operator, transmit suitable control commands to the turbine controller 26 for adjusting the operation of its associated wind turbine 10.

As shown in FIG. 4, each server 112 may also include a network or communications interface 124 to allow the server 112 to communicate over the network 110. In general, the communications interface 124 may correspond to any suitable device/medium that allows the server 112 to interface with the network 110.

Additionally, similar to the server(s) 112, each turbine controller 26 may also include one or more processor(s) 130 and associated memory 132. Such memory 132 may generally be configured to store information accessible to the processor(s) 130, including data 134 that can be retrieved, manipulated, created and/or stored by the processor(s) 130 and instructions 136 that can be executed by the processor(s) 130. For example, in several embodiments, the data 134 may be stored in one or more databases, such as a performance database (not shown) storing information relating to one or more operating parameters of the associated wind turbine 10.

Moreover, in several embodiments, the instructions 136 stored within the memory 132 of each turbine controller 26 may be executed by the processor(s) 130 to implement a back-up or secondary SCADA module 138. In general, the secondary SCADA module 138 may be configured to allow the turbine controller 26 to locally perform the same or similar functions to those performed by the off-site SCADA system 104, which may be particularly advantageous when the wind farm 102 has lost connectivity to the SCADA system 104 (e.g., when the network 110 is down). For example, the secondary SCADA module 138 may be configured to allow the turbine controller 26 to serve as a data acquisition unit for collecting and/or monitoring the operating parameters of every wind turbine 10 within the wind farm 102. In addition, the secondary SCADA module 138 may allow the turbine controller 26 to provide access to the HMI or control interface of every other turbine controller 26 connected to the local wind farm network 106. For example, the secondary SCADA module 138 may provide a HMI or control interface that links to every other HMI or control interface within the farm 102. As a result, the secondary SCADA module 138 may serve as a means for an operator or technician to locally manage every wind turbine 10 within the wind farm 102.

In one embodiment, the secondary SCADA module 138 implemented on a given turbine controller 26 may be configured to provide the exact same functionality as the SCADA module 122 implemented by the server(s) 122 running the off-site SCADA system 104. However, given the storage and/or processing limitations associated with many turbine controllers 26, the secondary SCADA module 148 may, in alternative embodiments, correspond to a significantly lighter version of the SCADA module 122 being implemented by the server(s) 112. For example, in a particular embodiment, the secondary SCADA module 138 may only configure a given turbine controller 26 to collect and/or monitor certain data from other turbine controllers 26 within the wind farm 102 that is related to key performance indicators, such as the fault status of each wind turbine 10, the wind speed associated with each wind turbine 10, the rotational operating speed of each wind turbine 10, the power output of each wind turbine 10 and/or the like.

Moreover, as shown in FIG. 4, each turbine controller 26 may also include a network or communications interface 140 for providing communications over the local wind farm network 106 and/or the network 110. Similar to the interface 124 for the server(s) 112, the communications interface 140 may generally be any device/medium that allows the turbine controller 26 to interface with the wind farm network 106 and/or the network 110.

Additionally, as indicated above, a client device 150 may be configured to connect to the local farm network 106 and/or the network 110 to allow an operator using the device 150 to remotely or locally communicate with the server(s) 112 of the off-site SCADA system 104 and/or the individual turbine controllers 26. In general, the client device 150 may correspond to any suitable computing device or other suitable processing unit. Thus, the client device 150 may include one or more processor(s) 152 and associated memory 154. Similar to the computing devices described above, the memory 154 may generally be configured to store information accessible to the processor(s) 152, including data that can be retrieved, manipulated, created and/or stored by the processor(s) 152 and instructions that can be executed by the processor(s) 152. Additionally, as shown in FIG. 4, the client device 150 may include a network or communications interface 156 for providing communications over the local wind farm network 106 and/or the network 110.

In accordance with aspects of the present subject matter, the client device 150 may be utilized by an operator to communicate with one or more of the turbine controllers 26 when network connectivity between the SCADA system 104 and the wind farm 102 has been lost, thereby allowing the operator to continue to monitor and control the wind turbines 10 located within the wind farm 102. Specifically, in several embodiments, when network connectivity is lost, the client device 150 may be configured to communicate with one of the turbine controllers 26 implementing the secondary SCADA module 138. As a result, the operator may view the monitored operating parameters of every wind turbine 10 within the wind farm 102 via the interface provided by the secondary SCADA module 138. In addition, as indicated above, implementation of the secondary SCADA module 138 may allow the turbine controller 26 to provide a link that enables an operator to access the control interface of every other turbine controller 26. Given such access, the operator may then directly communicate with a given turbine controller 26 via his/her client device 150 in order to control the operation of the controller's associated wind turbine 10.

Referring now to FIG. 5, one embodiment of a method 200 for monitoring and controlling wind turbines located within a wind farm is illustrated in accordance with aspects of the present subject matter. In general, the method 200 will be described herein with reference to the system 100 described above with reference to FIGS. 3 and 4, particularly in an instance in which connectivity has been lost between the off-site SCADA system 104 and the wind farm 102. However, it should be appreciated that aspects of the the disclosed method 200 may be utilized in any instance, regardless of connectivity issues, to allow an operator to communicate with one or more turbine controllers 26 in order to monitor and/or control the operation of all or a portion of the wind turbines 10 located within a wind farm 102. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 includes receiving, with a turbine controller located within the wind farm (hereinafter referred to as the "first turbine controller"), an indication of a loss of connectivity between the wind farm and an off-site SCADA system. In general, any suitable signal or input may provide the indication that there has been a loss of connectivity between the wind farm 102 and the off-site SCADA system 104. For example, in one embodiment, each turbine controller 26 may be configured to automatically sense or detect when the data connection to the off-site SCADA system 104 is lost. Alternatively, the indication may correspond to an operator input received by one of the turbine controllers 26. For example, in the event of connectivity issues, an operator may instruct one of the turbine controllers 26 to execute the instructions 136 stored within its memory 132 to implement the associated secondary SCADA module 138 so as to provide a means for monitoring and/or controlling the operation of one or more of the wind turbines 10 located within the wind farm 102.

Additionally, at (204), the method 200 includes accessing, with the first turbine controller, data from a second turbine controller within the farm that is related to one or more operating parameters for a wind turbine associated with the second turbine controller. Specifically, as indicated above, the secondary SCADA module 138 may allow each turbine controller 26 to monitor all or a select few of the operating parameters of every wind turbine 10 within the wind farm 102, such as by configuring a given turbine controller 26 to monitor one or more key performance indicators of the wind turbines 10. As a result, an operator connected to the first turbine controller (e.g., via his/her client device 150) may access and view the operating parameter(s) associated with each wind turbine 10 within the wind farm 102.

Moreover, at (206), the method 200 includes providing, with the first turbine controller, access to a control interface of the second turbine controller. Specifically, as indicated above, implementation of the secondary SCADA module 138 may allow each turbine controller 26 to provide a link to the HMI or control interface of every other turbine controller 26 connected to the local wind farm network 106. Such interface linking may then allow the operator (via his/her client device 150) to gain access to the control interface of another turbine controller 26. As a result, the operator may view and interact with the control interface of the other turbine controller 26, thereby allowing the operator to directly control the operation of the wind turbine 10 associated with such other turbine controller 26 via the client device 150.

It should be appreciated that aspects of the present subject matter have been described herein with reference to an operator communicating with one or more turbine controllers 26 via his/her client device 150 in order to monitor and/or control the operation of any number of wind turbines 10 located within a wind farm 102. However, in other embodiments, the secondary SCADA module 138 implemented by a given turbine controller 26 may allow the controller 26 to access the control interface of another turbine controller 26 within the wind farm 102 and subsequently autonomously control the operation of the wind turbine 10 associated with such other turbine controller 26. Specifically, the turbine controller 26 implementing the secondary SCADA module 138 may be provided with a list of maximum/minimum operating parameters and/or other triggers that may be referenced by the controller 26 when monitoring the operating parameters of the other wind turbines 10 within the wind farm 102. In such an embodiment, if an operating parameter for a given wind turbine exceeds a predetermined maximum or falls below a predetermined minimum defined such parameter (or if any other trigger event occurs), the controller 26 may be configured to gain access to the control interface associated with the wind turbine 10 and automatically implement one or more corrective actions in order to adjust the operation of the wind turbine 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for monitoring and controlling the operation of wind turbines located within a wind farm, the system comprising:

a first wind turbine located within the wind farm, the first wind turbine including a first turbine controller configured to monitor one or more operating parameters associated with the first wind turbine and provide a first control interface for controlling the operation of the first wind turbine;

a second wind turbine located within the wind farm, the second wind turbine including a second turbine controller configured to monitor one or more operating parameters associated with the second wind turbine and provide a second control interface for controlling the operation of the second wind turbine, the second turbine controller including a processor and associated memory, the memory storing instructions that, when implemented by the processor, configure the second turbine controller to execute a local supervisory control and data acquisition (SCADA) module that allows the second turbine controller to both access data from the first turbine controller and access the first control interface of the first turbine controller; and an off-site SCADA system located remote to the wind farm, the off-site SCADA system including a server communicatively coupled to the first and second turbine controllers, the server being configured to communicate control signals to the first and second turbine controllers in order control the operation of the first and second wind turbines, the offsite SCADA system being further configured to receive data associated with the one or more operating parameters monitored by the first and second turbine controllers, wherein, when connectivity is lost between the wind farm and the off-site SCADA system, the second turbine controller is configured to execute the local SCADA module to access the first control interface and generate control commands for controlling the operation of the first wind turbine, and wherein the first turbine controller includes a processor and associated memory, the memory storing instructions that, when implemented by the processor, configure the first turbine controller to execute a separate local SCADA module that allows the first turbine controller to both access data from the second turbine controller and access the second control interface of the second turbine controller.

2. The system of claim 1, wherein execution of the local SCADA module further configures the second turbine controller to access data from the first turbine controller associated with one or more operating parameters of the first wind turbine, the one or more operating parameters comprising at least one of a fault status of the first wind turbine, a wind speed associated with the first wind turbine, a rotational operating speed associated with the first wind turbine or a power output of the first wind turbine.

3. The system of claim 1, further comprising a secondary computing device communicatively coupled to the second turbine controller via a network, the second turbine controller being further configured to provide the secondary computing device access to the first control interface of the first turbine controller in order to allow the operation of the first wind turbine to be controlled by the secondary computing device via the local SCADA module executed by the second turbine controller.

4. The system of claim 1, wherein the wind farm includes a plurality of wind turbines, each wind turbine including a turbine controller configured to provide a control interface for controlling the operation of the associated wind turbine, wherein the second turbine controller is configured to execute the local SCADA module to access data associated with one or more operating parameters of the each of the plurality of wind turbines and to also provide access to the control interface of each turbine controller of the wind farm.

5. The system of claim 1, further comprising a plurality of wind farms located remote to the off-site SCADA system, wherein the server is communicatively coupled to turbine controllers contained within each of the plurality of wind farms.

6. A system for monitoring and controlling the operation of wind turbines located within a wind farm, the system comprising:
    a first wind turbine including a first turbine controller configured to monitor one or more operating parameters associated with the first wind turbine and provide a first control interface for controlling the operation of the first wind turbine; and
    a second wind turbine including a second turbine controller configured to monitor one or more operating parameters associated with the second wind turbine and provide a second control interface for controlling the operation of the second wind turbine, the second turbine controller including a processor and associated memory, the memory storing instructions that, when implemented by the processor, configure the second turbine controller to execute a local supervisory control and data acquisition (SCADA) module that allows the second turbine controller to provide access to the first control interface of the first turbine controller; and
    a secondary computing device communicatively coupled to the second turbine controller via a network,
    wherein the second turbine controller is configured to execute the local SCADA module to provide the secondary computing device access to the first control interface in order to allow the operation of the first wind turbine to be controlled by the secondary computing device, the second turbine controller generating control commands for controlling the operation of the first wind turbine based on inputs received from the secondary computing device,
    wherein the first turbine controller includes a processor and associated memory, the memory storing instructions that, when implemented by the processor, configure the first turbine controller to execute a separate local SCADA module that allows the first turbine controller to access data from the second turbine controller associated with the one or more operating parameters of the second wind turbine and to provide the secondary computing device access to the second control interface of the second turbine controller.

7. The system of claim 6, wherein the second turbine controller is configured to receive an indication associated with a loss of connectivity with an off-site SCADA system located remote to the wind farm.

8. The system of claim 7, wherein, upon receipt of the indication of the loss of connectivity, the second turbine controller is configured to provide the secondary computing device access to the first control interface in order to control the operation of the first wind turbine.

9. The system of claim 6, wherein the second turbine controller is configured to provide the secondary computing device a link to the first turbine controller over the network.

10. The system of claim 6, wherein the memory further stores instructions that, when implemented by the processor, configure the second turbine controller to access data from the first turbine controller associated with the one or more operating parameters of the first wind turbine.

11. The system of claim 10, wherein the one or more operating parameters comprise at least one of a fault status of the first wind turbine, a wind speed associated with the first wind turbine, a rotational operating speed associated with the first wind turbine or a power output of the first wind turbine.

12. The system of claim 6, wherein the system includes a plurality of wind turbines, each wind turbine including a turbine controller configured to provide a control interface for controlling the operation of the associated wind turbine, wherein the second turbine controller is configured to provide the secondary computing device access to the control interface of each turbine controller of the wind farm.

13. A method for monitoring and controlling the operation of wind turbines located within a wind farm, the wind farm including a first wind turbine having a first turbine controller and a second wind turbine having a second turbine controller, the method comprising:
    receiving, with the first turbine controller, an indication of a loss of connectivity with an off-site supervisory control and data acquisition (SCADA) system configured to transmit control signals to the first and second turbine controllers for controlling the operation of the first and second wind turbines;
    accessing, with the first turbine controller, data from the second turbine controller associated with one or more operating parameters of the second wind turbine;
    providing, with the first turbine controller, access to a control interface of the second turbine controller; and
    generating, with the first turbine controller, control commands for controlling the operation of the second turbine controller, wherein both the first turbine controller and the second turbine controller are independently configured to implement a local SCADA module for accessing data from at least one separate turbine controller and accessing a control interface of the at least one separate turbine controller.

14. The method of claim 13, wherein the one or more operating parameters comprise at least one of a fault status of the first wind turbine, a wind speed associated with the first wind turbine, a rotational operating speed associated with the first wind turbine or a power output of the first wind turbine.

15. The method of claim 13, further comprising providing a secondary computing device communicatively coupled to the first turbine controller access to the data.

16. The method of claim 13, wherein providing access to the control interface of the second turbine controller comprises providing a secondary computing device communicatively coupled to the first turbine controller access to the control interface of the second turbine controller.

17. The method of claim 13, wherein the wind farm includes a plurality of wind turbines, each wind turbine including a turbine controller configured to provide a control interface for controlling the operation of the associated wind turbine, wherein the first turbine controller is configured to access data from each turbine controller of the wind farm associated with one or more operating parameters of each of the plurality of wind turbines and provide access to the control interface of each turbine controller of the wind farm.

* * * * *